Patented Dec. 15, 1936

2,064,608

UNITED STATES PATENT OFFICE 2,064,608

CELLULOSE DERIVATIVE COATING COMPOSITION

Robert Tyler Hucks, South River, N. J., assignor to E. I. du Pont de Nemours & Company, Wilmington, Del., a corporation of Delaware No Drawing. Application July 7, 1934, Serial No. 734,211

10 Claims.  (Cl. 134—79)

This invention relates to a decorative and protective coating composition for use on electrical equipment and more particularly to a decorative and protective coating composition having high insulating properties, high dielectric strength and high resistance to so-called "arc trailing."

In the finishing of electric switch boards, insulated wires and other similar equipment which is used in connection with high tension electric currents, it is necessary to use decorative and protective coating compositions which in themselves have high insulating properties, high dielectric strength and high resistance to so-called "arc trailing." "Arc trailing" is a property possessed by some surfaces of readily supporting an electric arc over any area where an arc has previously been formed. Resistance to this "arc trailing" is of particular importance in surface coatings for switch boards and it is frequently desirable that such coating compositions possess decorative value, for example, hiding power, as well as protective properties. Soluble black dyes have been incorporated in the compositions for such purposes in amounts sufficient to produce an opaque or nearly opaque finished film. The use of such soluble black dyes has two definite disadvantages. First, the composition containing the dyes cannot be made sufficiently opaque unless an excessive amount of the dye is used, and second, the resultant finish has too high a luster. Black pigments such as lamp black, carbon black, bone black, which are commonly used in coating compositions to produce high hiding power, reduce the insulating properties, dielectric strength and resistance to "arc trailing" to such an extent that their use is unsatisfactory for the purpose of the invention. It is highly desirable for most electrical equipment used in connection with high tension currents, particularly switch boards, to have a matte finish rather than a high luster finish.

This invention has as an object the production of opaque coating compositions which will produce a film possessing high insulating properties and high dielectric strength. A further object is the production of a coating composition which, in addition to producing a film of satisfactory insulating properties, dielectric strength and opaqueness, will also produce a film which has a matte finish. A further object is the production of a surface coating having high resistance to "arc trailing."

These objects are accomplished in the present invention by the provision of a composition in which manganese dioxide in a finely divided condition, is dispersed in a coating composition, the ingredients of such coating composition being selected so that there will be no reducing action upon the highly reactive manganese dioxide either during storage of the composition or in the dried film deposited from such a composition.

The invention is best exemplified by the following examples of compositions which are given as illustrations, and not by way of limitation:

Example I

| | Per cent |
|---|---|
| Manganese dioxide | 37.5 |
| Dibutyl phthalate | 2.0 |
| Castor oil | 1.0 |
| ½" nitrocellulose | 9.0 |
| 50% solution of dewaxed shellac in ethyl alcohol | 20.0 |
| Butyl alcohol | 5.0 |
| Denatured alcohol | 6.5 |
| Ethyl acetate | 3.0 |
| Butyl acetate | 13.0 |
| Toluene | 3.0 |
| | 100.0 |

Example II

| | Per cent |
|---|---|
| Manganese dioxide | 12.0 |
| Nigrosine | 0.8 |
| Dibutyl phthalate | 3.6 |
| Castor oil | 2.3 |
| ½" nitrocellulose | 11.0 |
| 44% dammar solution | 9.3 |
| Butyl alcohol | 3.0 |
| Denatured alcohol | 9.0 |
| Ethyl acetate | 20.0 |
| "Pentasol" acetate | 4.0 |
| Toluene | 7.0 |
| Solvent naphtha | 15.0 |
| Butyl acetate | 3.0 |
| | 100.0 |

Example III

| | Per cent |
|---|---|
| Manganese dioxide | 20.0 |
| Tricresyl phosphate | 3.0 |
| Condensation product of para toluene sulphamide and formaldehyde | 5.0 |
| Cellulose acetate | 8.0 |
| Diacetone alcohol | 26.0 |
| Methyl alcohol | 12.0 |
| Acetone | 6.0 |
| Mono methyl ether of ethylene glycol | 20.0 |
| | 100.0 |

These compositions are prepared by dispersing the cellulose derivative in the solvent media and adding the other ingredients according to procedures well known in the art. Suitable variations can be incorporated without departing from the spirit of the invention and such variations will be readily apparent to those skilled in the art.

The nigrosine in Example II is a soluble black dye which may be used to impart a more pleasing appearance to the finished product. However, its use is optional.

In preparing the compositions of the invention, it is important to avoid the introduction of any material which will have a tendency to reduce the manganese dioxide or on which conversely the manganese dioxide will have an oxidizing effect either by direct oxidation or by catalytic means. Drying oils, for example, should be especially avoided, since manganese salts are well known siccatives for such materials. It is apparent, therefore, that ordinary paint vehicles are unsatisfactory.

Other cellulose derivatives than those mentioned in the examples, such as cellulose ether, for example ethyl cellulose and benzyl cellulose can be satisfactorily used. In the preparation of such compositions the choice of solvents is wide and will be readily apparent to those skilled in the art. The use of gums or resins, either natural or synthetic, also offers a rather wide range of choice.

In the above examples the manganese dioxide varies from 12% to 37½%. The preferred range is usually from 10% to 50%. However, I do not want to be limited to the exact range, since for certain purposes I may use even less than 10% and for other purposes even more than 50%, as will be evident to those skilled in the art.

The composition of the invention is particularly adaptable for use on electrical equipment for decorative and protective purposes such as switch boards, electric conduits, cables, transformers, generators, electric recording devices, etc. It finds use also for other articles where a protective and decorative coating composition having the desirable properties possessed by the composition of the invention is desired or necessary.

The invention presents as advantages over the present state of the art, the fact that the composition produces an opaque film having high insulating properties and high dielectric strength. Further, the composition produces an opaque film having the desired matte finish without impairing the necessary electrical properties. A further advantage is the production of a decorative and protective coating which possesses a high resistance to "arc trailing", a highly desirable property in coating compositions used on certain types of electrical equipment.

It is apparent that many widely different embodiments of this invention may be made without departing from the spirit and scope thereof and, therefore, it is not intended to be limited except as indicated by the appended claims.

I claim:

1. In the process of preparing cellulose derivative coating compositions of high dielectric strength, the step of adding from 10 to 50% by weight of finely divided manganese dioxide.

2. A coating composition comprising a cellulose derivative, a softener, a resin, and 10 to 50% of finely divided manganese dioxide.

3. The composition of claim 2, in which the cellulose derivative is cellulose acetate.

4. The coating composition of claim 2, in which the cellulose derivative is cellulose nitrate.

5. A coating composition comprising a cellulose derivative, a softener, a resin, and from 10 to 50% by weight of finely divided manganese dioxide.

6. A coating composition of high dielectric strength containing approximately the following formula by weight:

| | Per cent |
|---|---|
| Manganese dioxide | 37.5 |
| Dibutyl phthalate | 2.0 |
| Castor oil | 1.0 |
| ½" nitrocellulose | 9.0 |
| 50% solution of dewaxed shellac in ethyl alcohol | 20.0 |
| Butyl alcohol | 5.0 |
| Denatured alcohol | 6.5 |
| Ethyl acetate | 3.0 |
| Butyl acetate | 13.0 |
| Toluene | 3.0 |

7. A coating composition of high dielectric strength containing approximately the following formula by weight:

| | Per cent |
|---|---|
| Manganese dioxide | 20.0 |
| Tricresyl phosphate | 3.0 |
| Condensation product of para toluene sulphamide and formaldehyde | 5.0 |
| Cellulose acetate | 8.0 |
| Diacetone alcohol | 26.0 |
| Methyl alcohol | 12.0 |
| Acetone | 6.0 |
| Mono methyl ether ethylene glycol | 20.0 |

8. A coating composition of high dielectric strength comprising a cellulose derivative and from 10 to 50% of manganese dioxide.

9. The coating composition of claim 8 which includes a resin.

10. The coating composition of claim 8 which includes a softener.

ROBERT TYLER HUCKS.